(12) United States Patent
Joo et al.

(10) Patent No.: US 9,780,667 B2
(45) Date of Patent: Oct. 3, 2017

(54) DISPLAY APPARATUS, POWER SUPPLY AND POWER SUPPLY METHOD THEREOF

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 14/788,914

(22) Filed: Jul. 1, 2015

(65) Prior Publication Data

US 2016/0005376 A1   Jan. 7, 2016

(30) Foreign Application Priority Data

Jul. 2, 2014  (KR) ........................ 10-2014-0082524

(51) Int. Cl.
*H02M 3/335*  (2006.01)
*H02M 1/00*  (2006.01)

(52) U.S. Cl.
CPC ... *H02M 3/33507* (2013.01); *H02M 3/33523* (2013.01); *G09G 2330/021* (2013.01); *H02M 2001/0025* (2013.01); *H02M 2001/0032* (2013.01); *Y02B 70/16* (2013.01)

(58) Field of Classification Search
CPC . H02M 2001/0006; H02M 2001/0032; H02M 2001/0035; H02M 3/335; H02M 3/33507
See application file for complete search history.

(56) References Cited

U.S. PATENT DOCUMENTS

| | | | | |
|---|---|---|---|---|
| 5,734,564 A | * | 3/1998 | Brkovic | ............ H02M 3/33523 363/20 |
| 2012/0134190 A1 | * | 5/2012 | Lee | .......................... H02M 1/36 363/100 |
| 2012/0201062 A1 | | 8/2012 | Lee | |

FOREIGN PATENT DOCUMENTS

| KR | 10-2010-0062836 A | 6/2010 |
|---|---|---|
| KR | 10-2011-0071397 A | 6/2011 |
| KR | 10-1043310 B1 | 6/2011 |
| KR | 10-2011-0085405 A | 7/2011 |
| KR | 10-2011-0122987 A | 11/2011 |

* cited by examiner

*Primary Examiner* — Gary L Laxton
(74) *Attorney, Agent, or Firm* — Sughrue Mion, PLLC

(57) ABSTRACT

A display apparatus, a power supply and a power supply method are disclosed. A power supply for a display apparatus includes a switching driver configured to perform a switching operation and output an operation voltage; a first charger/discharger configured to set timing of the switching operation; and a controller configured to control the switching driver to disable the switching operation until a voltage previously charged in the first charger/discharger is discharged up to a first voltage, when the display apparatus is in a power saving mode.

20 Claims, 8 Drawing Sheets

DISPLAY APPARATUS, POWER SUPPLY AND POWER SUPPLY METHOD THEREOF

CROSS-REFERENCE TO RELATED APPLICATION

This application claims priority from Korean Patent Application No. 10-2014-00082524, filed on Jul. 2, 2014 in the Korean Intellectual Property Office, the disclosure of which is incorporated herein by reference in its entirety.

BACKGROUND

Field

Apparatuses and methods consistent with exemplary embodiments relate to a display apparatus, a power supply and a power supply method thereof, and more particularly to a display apparatus, a power supply and a power supply method thereof, in which a switching operation is performed to supply operation power in a power saving mode.

Description of the Related Art

Display apparatuses, such as a television (TV) or other display, typically operate by receiving power from an internal or external power supply. FIG. 1 is a circuit diagram of a power supply in a related art display apparatus. Power supply 1 of a display apparatus performs a switching operation to supply power to a system 16, thereby maintaining an operation state in a power saving mode.

The following details about the power supply 1 of the related art display apparatus may not necessarily be well-known. The power supply 1 shown in FIG. 1 may include a rectifier 12 to rectify the current output from alternating current (AC) power source 11, and a smoother 13 (e.g., a filter) for smoothing the rectified output to provide direct current (DC), thereby supplying operation power Vout to a system 16. The power supply 1 may further include a primary coil 14, to which the rectified input voltage VIN is applied, and a secondary coil 15, from which operation voltage Vout is output based on voltage that is induced at the primary coil 14.

A power integrated circuit (IC) 19 drives a metal oxide semiconductor field effect transistor (MOSFET) 18 to perform the switching operation in order to supply the operation voltage Vout in the power saving mode, and controls the switching operation of the MOSFET 18, including determining whether the switching operation is performed. The power IC 19 controls the switching operation of the MOSFET 18 based on the operation voltage Vout in the power saving mode.

To solve a problem that power is continuously consumed by the switching operation even in the power saving mode, a method of skipping a part of the switching operation has been used to decrease an operation load of a circuit used in the switching operation, thereby decreasing the power consumption.

The method of skipping a part of the switching operation requires control of the timing for when the switching operation will be skipped. However, monitoring and feedback operations for the operation voltage Vout are required to control the timing of the switching operation to provide a stable supply of the operation voltage Vout, and there is a limit in the reduction of power consumption if the circuit for monitoring the operation voltage Vout is continuously operated.

Such power consumption is a problem that may arise not only in display apparatuses, but also in various types of electronic devices having the power systems similar to the foregoing.

SUMMARY

Accordingly, an aspect of one or more exemplary embodiments may provide a display apparatus, a power supply and a power supply method thereof, which can reduce power consumed by a feedback operation for an operation voltage needed in timing control of a switching operation when the switching operation is skipped in a power saving mode of the display apparatus.

According to an aspect of another exemplary embodiment, there is provided a power supply for an electronic apparatus, including: a switching driver configured to perform a switching operation and output an operation voltage; a first charger/discharger configured to set a timing of the switching operation; and a controller configured to control the switching driver to disable the switching operation until a voltage previously charged by the first charger/discharger is discharged to a first voltage, when the electronic apparatus is in a power saving mode.

The power supply may further include a second charger/discharger configured to supply power for the switching operation, and the controller may be configured to charge the first charger/discharger and the second charger/discharger so that a voltage of the second charger/discharger can be charged to a second voltage, and to control the switching driver to perform the switching operation and output the operation voltage when the voltage of the second charger/discharger is charged to the second voltage.

The controller may be configured to control the switching operation to be disabled when the output operation voltage reaches a third voltage.

The power supply may further include an auxiliary power supply configured to charge the first charger/discharger and the second charger/discharger, and the controller may be configured to control the auxiliary power supply to supply an auxiliary voltage to the first charger/discharger and the second charger/discharger from a time when a charging voltage of the first charger/discharger is discharged to the first voltage to a time when the auxiliary voltage of the second charger/discharger is charged to the second voltage.

The power supply may further include a feedbacker configured to feed back the operation voltage for the switching operation, and the controller may be configured to control the feedbacker to disable the feedback operation when the switching operation is disabled.

The power supply may further include a mode selector configured to receive a signal for selecting a mode to disable the switching operation, and the controller may be configured to determine whether to disable the switching operation in accordance with the signal received by the mode selector.

In accordance with another exemplary embodiment, there is provided a method of controlling a power supply for an electronic apparatus that includes a switching driver for supplying an operation voltage, the method including: controlling the switching driver to perform a switching operation and output the operation voltage; and disabling the switching operation until a voltage previously charged by a first charger/discharger for setting timing of the switching operation is discharged to a first voltage, when the electronic apparatus is in a power saving mode.

The method may further include performing the switching operation when a voltage of a second charger/discharger for supplying power for the switching operation is charged to a second voltage.

The method may further include disabling the switching operation when the operation voltage reaches a third voltage.

The method may further include supplying auxiliary power to the first charger/discharger and the second charger/discharger from a time when a charging voltage of the first charger/discharger is discharged up to the first voltage to a time when the auxiliary voltage of the second charger/discharger is charged up to the second voltage.

The method may further include feeding back the operation voltage for the switching operation; and disabling the feedback operation when the switching operation is disabled.

The method may further include receiving a signal for selecting a mode to disable the switching operation; and determining whether to disable the switching operation in accordance with the received signal.

In accordance with another exemplary embodiment, there is provided a display apparatus including: an image processor configured to process an image signal; a display configured to display an image based on the image signal; a first controller configured to control the display of the image; and a power supply configured to supply an operation voltage to the first controller, the power supply including: a switching driver configured to perform a switching operation and output an operation voltage; a first charger/discharger configured to set timing of the switching operation; and a second controller configured to control the switching driver to disable the switching operation until a voltage previously charged by the first charger/discharger is discharged to a first voltage, when the display apparatus is in a power saving mode.

The display apparatus may further include a second charger/discharger configured to supply power for the switching operation, and the second controller may be configured to charge the first charger/discharger and the second charger/discharger so that a voltage of the second charger/discharger can be charged to a second voltage, and to control the switching driver to perform the switching operation and output the operation voltage when the voltage of the second charger/discharger is charged to the second voltage and to disable the switching operation when the output operation voltage is boosted to a third voltage.

The display apparatus may further include an auxiliary power supply configured to charge the first charger/discharger and the second charger/discharger, and the second controller may be configured to control the auxiliary power supply to supply an auxiliary voltage to the first charger/discharger and the second charger/discharger from a time when a charging voltage of the first charger/discharger is discharged to the first voltage to a time when the auxiliary voltage of the second charger/discharger is charged to the second voltage.

The display apparatus may further include a feedbacker configured to feed back the operation voltage for the switching operation, and the second controller may be configured to control the feedbacker to disable the feedback operation when the switching operation is disabled.

In accordance with another exemplary embodiment, there is provided a method of controlling a display apparatus which includes a switching driver for supplying an operation voltage and processes an image signal to display an image, the method including: controlling the switching driver to perform a switching operation and output the operation voltage; and disabling the switching operation until a voltage previously charged by a first charger/discharger for setting timing of the switching operation is discharged to a first voltage, when the display apparatus is in a power saving mode.

The method may further include performing the switching operation when a voltage of a second charger/discharger for supplying power for the switching operation is charged to a second voltage; and disabling the switching operation when the operation voltage reaches a third voltage.

The method may further include supplying auxiliary power to the first charger/discharger and the second charger/discharger from a time when a charging voltage of the first charger/discharger is discharged up to the first voltage to a time when the auxiliary voltage of the second charger/discharger is charged up to the second voltage.

The method may further include feeding back the operation voltage for the switching operation; and disabling the feedback operation if the switching operation is disabled.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
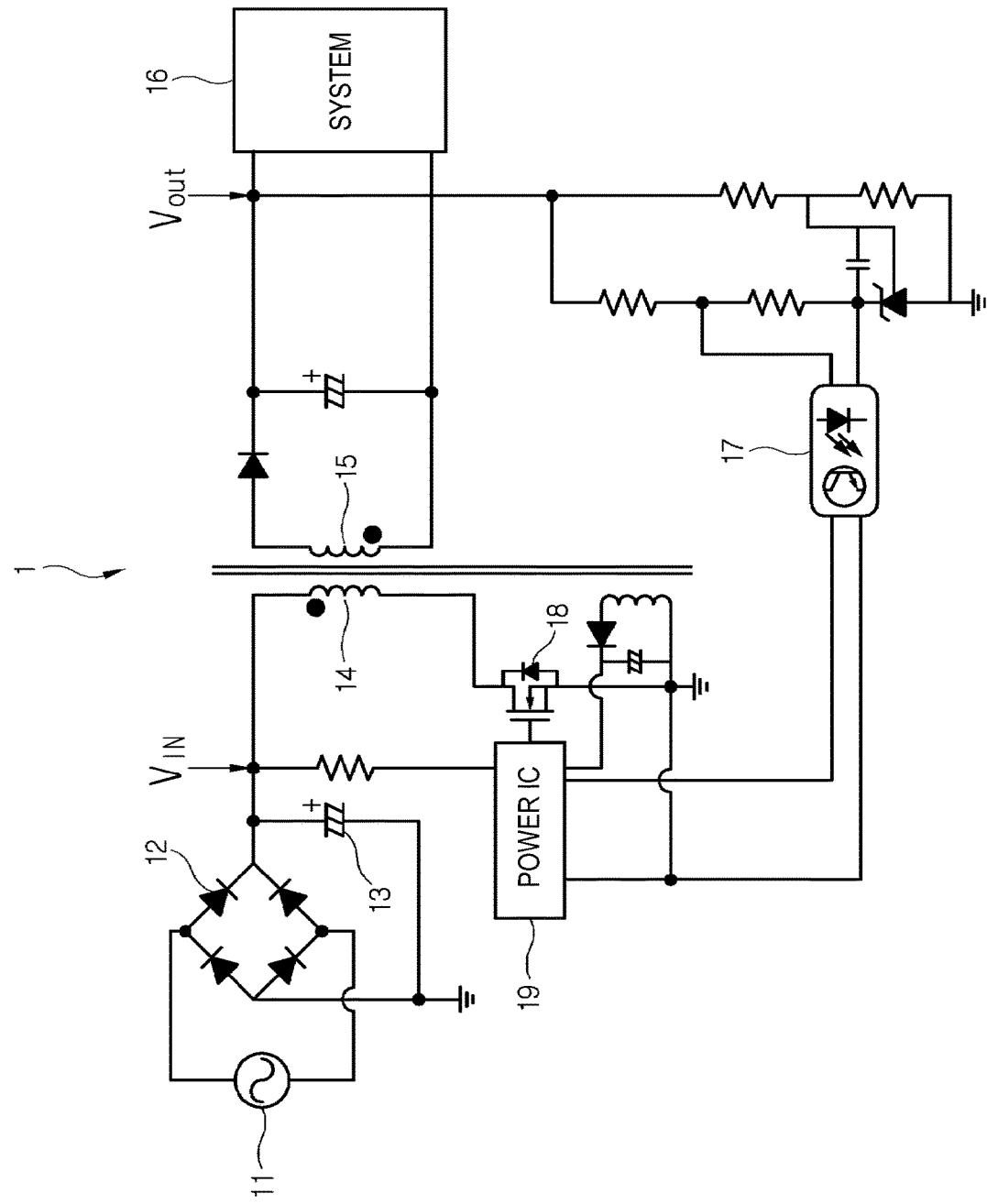
FIG. 1 is a circuit diagram of a power supply according to the related art.
Figure 2:
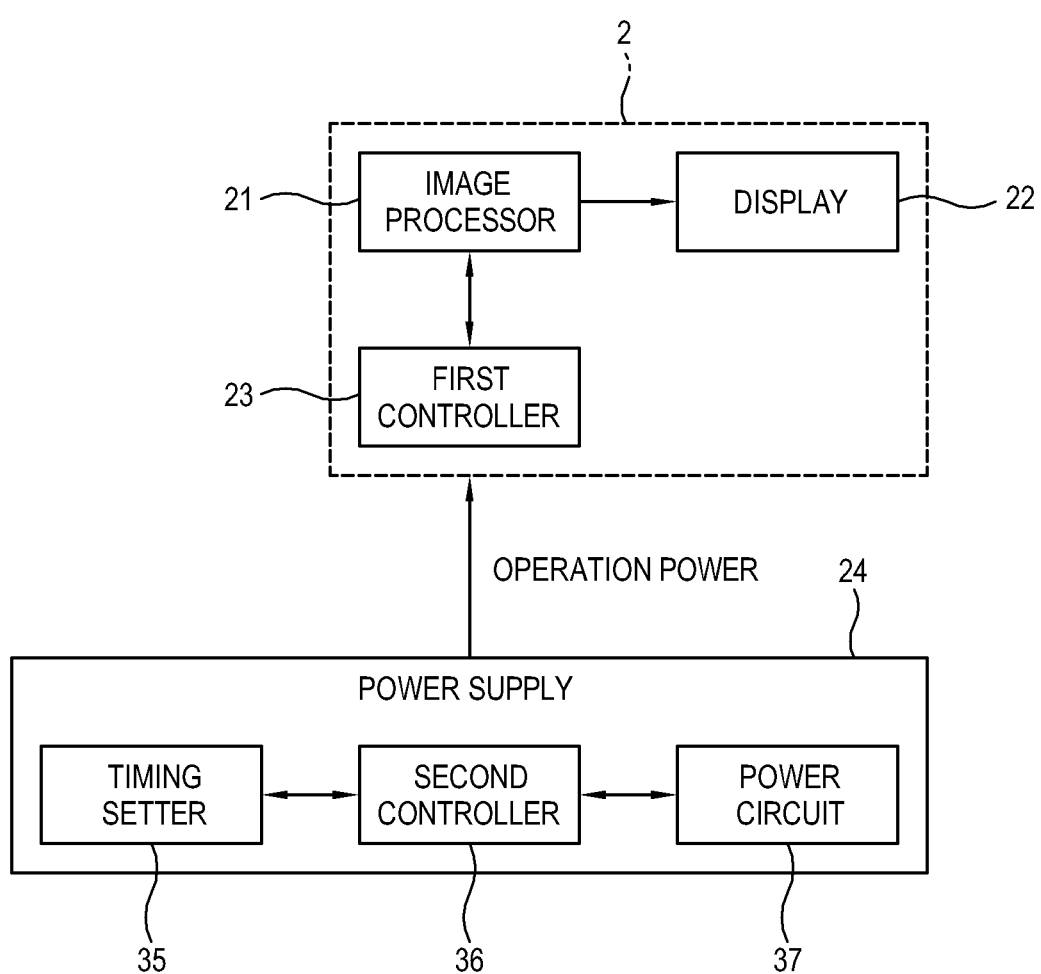
FIG. 2 is a block diagram of a display apparatus according to an exemplary embodiment.

FIG. 2 is a block diagram of a display apparatus 2 according to an exemplary embodiment. Below, the display apparatus 2 will be described with reference to FIG. 2.

The display apparatus 2 may be realized as a television (TV) or the like that receives and processes an image signal and displays an image based on the processed image signal. The display apparatus 2 may include a signal receiver (not shown), an image processor 21, a display 22, a first controller 23 and a power supply 24. However, the elements of the display apparatus 2 shown in FIG. 2 are merely an example, and the elements may vary as necessary in other exemplary embodiments. Although not shown, at least one among the elements of the display apparatus 2 shown in FIG. 2 may be excluded or a new element may be added.

The signal receiver receives an image signal. The signal receiver may include a tuner to receive a broadcasting signal or similar image signal. The tuner may be tuned to one channel selected among a plurality of channels and receive an image signal under control of the first controller 23. The channel may be selected by a user. Alternatively, the signal receiver may receive an image signal from an imaging device such as a set-top box, a digital versatile disc (DVD), a personal computer (PC), etc.; a peripheral device such as a smart phone, etc.; or over a network such as an Internet connection, etc.

The image processor 21 performs a predetermined signal process to display an image based on an image signal on the display 22. The image process performed in the image processor 21 may for example include modulation, demodulation, multiplexing, demultiplexing, analog-digital conversion, digital-analog conversion, decoding, image enhancing, scaling, etc.

The display 22 displays an image from the image signal processed by the image processor 21. The display 22 may display an image through various methods such as a liquid crystal display (LCD), a plasma display panel (PDP), an organic light emitting diode (OLED), etc. According to an exemplary embodiment, the display apparatus 2 has a normal mode where the display apparatus 2 performs normal operations of displaying an image on the display 22 and similar operation, and a power saving mode where the display apparatus 2 is not in the normal mode and consumes only minimal power.

The first controller 23 controls the signal receiver and the image processor 21 to display an image based on the received image signal. The first controller 23 may include a control program for implementing such control, nonvolatile and volatile memories for storing the entirety or a part of the control program, and a microprocessor for executing the control program.

The power supply 24 may supply power (hereinafter, referred to as 'operation power') so as to operate the signal receiver, the image processor 21, the display 22 and the first controller 23. The power supply 24 may include a timing setter 35, a second controller 36 and a power circuit 37. Although not shown, the power supply 24 may exclude at least one element from or include a new element to the elements shown in FIG. 2. In the power supply 24, the timing for controlling the switching operation is set in the power saving mode, thereby reducing power consumption due to timing control used for skipping the switching operation during the power saving mode.

The timing setter 35 sets the timing of the switching operation for supplying the operation voltage Vout to the display apparatus 2 when the display apparatus 2 is in the power saving mode. The timing setter 35 may include a capacitor 74, a memory, a hard disk drive (HDD) or other medium for setting the timing. Alternatively, the capacitor 74 or other medium for setting the timing may be included in the second controller 36. Below, the timing setter 35 including the capacitor 74 will be described. In the timing setter 35, the capacitor 74 may be charged and discharged by the second controller 36 based on a level of a charging voltage VT for the capacitor 74. The timing setter 35 may set the timing of the switching operation based on a charging time and a discharging time for the charging voltage VT of the capacitor 74. Below, the timing setter 35 will be described with reference to FIG. 5.

In the power saving mode 501, the display apparatus enters a discharging section 511 so that the switching operation for supplying the operation voltage Vout can be disabled. In the timing setter 35, the charging voltage VT of the capacitor 74 drops along with the auxiliary voltage Vcc for the switching operation during the discharging section 511 and these voltages are boosted during a charging section 512. When the auxiliary voltage Vcc reaches an upper limit 503 and the timing setter 35 enters a switching-on section 513 where the switching operation is normally performed, the charging voltage VT and the auxiliary voltage Vcc drop while being discharged, and the disabled switching operation is resumed, thereby boosting up the operation voltage Vout. When the operation voltage Vout reaches an upper limit 504 and the timing setter 35 enters a switching-disable section 514 where the switching operation is skipped, the charging voltage VT of the timing setter 35 is dropped while being discharged. Since the foregoing processes are repeated while the power saving mode continues, it is possible to control the switching operation based on the timing set by level control of the charging voltage VT and the auxiliary voltage Vcc in the power saving mode.

Figure 5:
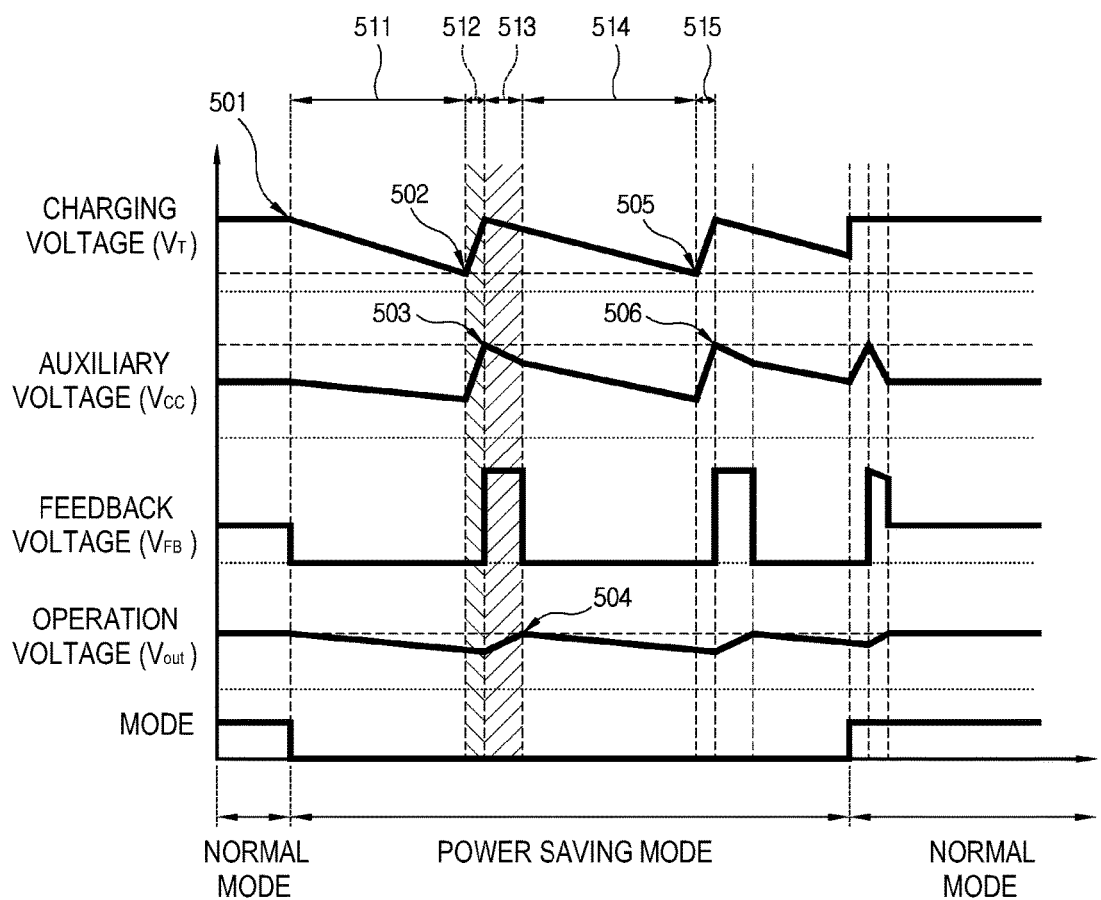
FIG. 5 shows waveforms of voltages applied to circuits of FIG. 3 according to an exemplary embodiment.

When the display apparatus 2 is in the power saving mode, the second controller 36 may control the power circuit 37 to stop the switching operation in a predetermined section in accordance with the timing set by the timing setter 35. Referring to FIG. 5, the second controller 36 will be described below. When the timing setter 35 enters the charging section 512 as the charging voltage VT reaches a lower limit 502, the second controller 36 boosts up the charging voltage VT of the timing setter 35 and the auxiliary voltage Vcc for switching operation. When the timing setter 35 enters the switching-on section 513 as the auxiliary voltage Vcc for the switching operation reaches upper limit 503, the second controller 36 resumes the switching operation to boost up the operation voltage Vout. When the timing setter 35 enters the switching-on section 513 as the auxiliary voltage Vcc for the switching operation reaches upper limit 503, the second controller 36 receives the operation voltage Vout from the power circuit 37 to be fed back as the feedback voltage VFB. During the switching-on section 513, the second controller 36 may compare the feedback voltage VFB and the operation voltage Vout and control the switching operation so that the operation voltage Vout can reach a predetermined target level based on a result of the comparison. If the switching operation causes the operation voltage Vout of the power circuit 37 to reach the upper limit 504 and the second controller 36 enters the switching-disable section 514, the second controller 36 may disable the switching operation and the feedback operation.

Further, the second controller 36 may control the capacitor 74 to be charged and discharged based on the level of the charging voltage VT of the capacitor 74 included in the timing setter 35. The second controller 36 may control the capacitor 74 to be discharged during the discharging section 511, the switching-on section 513 and the switching-disable section 514, and to be charged during the charging section 512, in accordance with the level of the capacitor 74 connected to an internal power source via a switch.

The second controller 36 stops the switching operation and the feedback operation during the discharging section 511, the charging section 512 and the switching-disable section 514 while the display apparatus 2 is in the power saving mode, thereby reducing the power consumption needed for the switching operation and the feedback operation.

The second controller 36 may be provided outside the power supply 24. However, this is merely exemplary and in alternative exemplary embodiments the second controller may be provided with power supply 24 or located elsewhere.

The power circuit 37 performs the switching operation to output the operation voltage Vout to a system 32. The power circuit 37 is controlled by the second controller 36 to stop the switching operation during a predetermined section in accordance with the timing set by the timing setter 35 when the display apparatus 2 is in the power saving mode, and supplies the feedback voltage VFB needed for the switching operation to the second controller 36. Below, the power circuit 37 will be described with reference to FIG. 5. The power circuit 37 may transmit a power saving mode signal to the second controller 36 when the power saving mode 501 is selected for the display apparatus 2. The power circuit 37 cannot boost up the operation voltage Vout and cannot feed the feedback voltage VFB back to the second controller 36 since the switching operation and the feedback operation are disabled during the discharging section 511 and the charging section 512. The power circuit 37 is controlled to enable the switching operation and the feedback operation during the switching-on section 513, thereby boosting up the operation voltage Vout output to the system 32 and feeding the feedback voltage VFB back to the second controller 36. The power circuit 37 may be controlled by the second controller 36 to perform the switching operation so that the operation voltage Vout can reach a predetermined target level based on the feedback voltage VFB. When the operation voltage Vout reaches the upper limit 504 and the timing setter 35 enters the switching-disable section 514, the power circuit 37 may be controlled to disable the switching operation and the feedback operation until entering the next discharging section 511.

Accordingly, power consumed by the switching operation and the feedback operation can be reduced when the display apparatus 2 is in the power saving mode.

Figure 3:
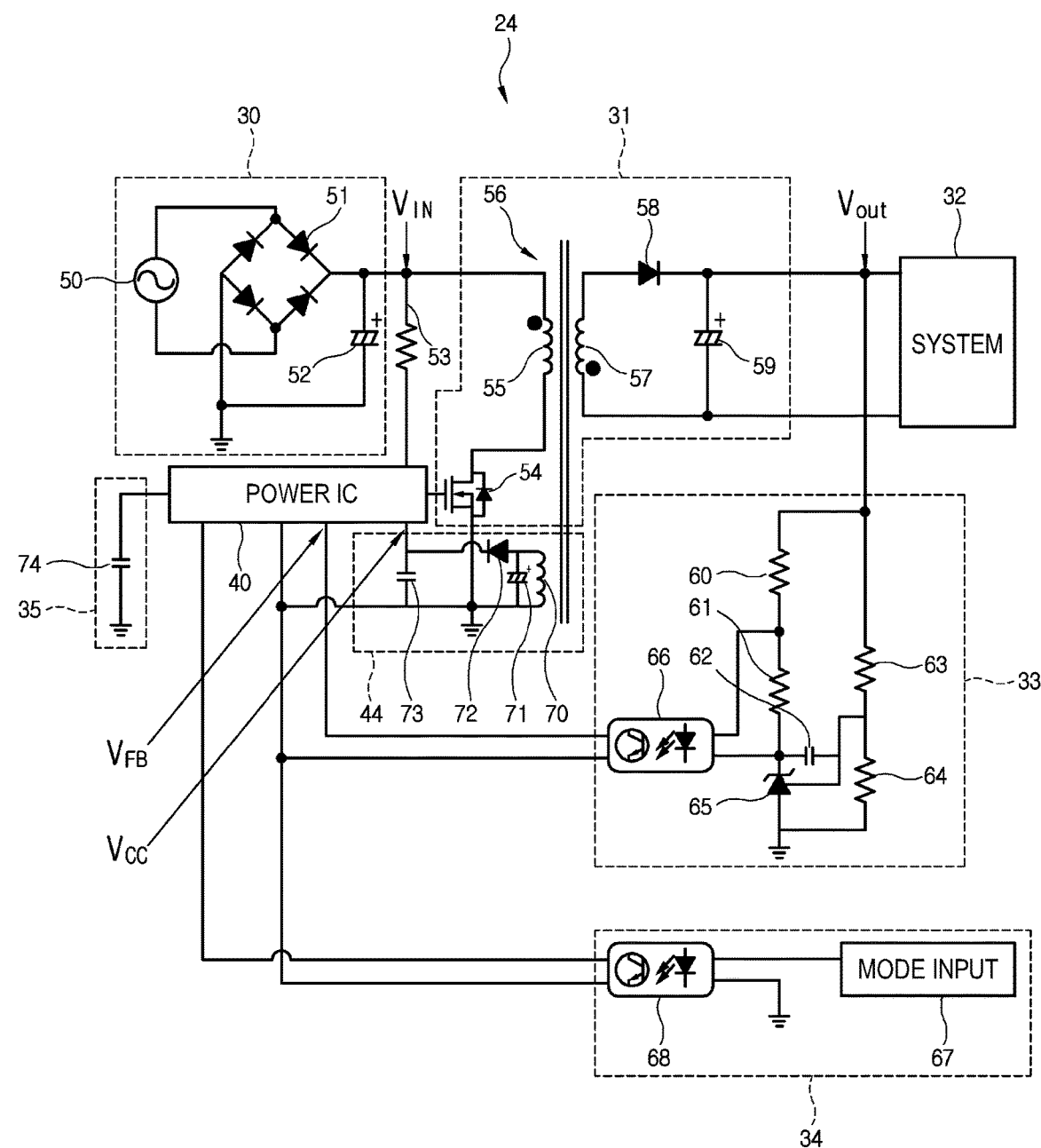
FIG. 3 is a circuit diagram of a power supply according to an exemplary embodiment.

Below, the power supply 24 according to an exemplary embodiment will be described in more detail with reference to FIGS. 3 to 5. FIG. 3 is a circuit diagram showing the power supply 24 of FIG. 2 in detail according to an exemplary embodiment.

In this exemplary embodiment, the power supply 24 may include a rectifying and smoothing circuit 30, a switching circuit 31, the system 32, a feedback input 33, a mode selection input 34, the timing setter 35, an auxiliary power supply 44 and a power IC 40. The elements of the power supply shown in FIG. 3 are merely exemplary, and may vary as necessary. For example, although not shown, the power supply 24 may exclude at least one element from or include a new element to the elements shown in FIG. 3.

The rectifying and smoothing circuit 30 converts an AC voltage into a DC voltage by rectifying current supplied by an AC power source 50, and smooths the converted DC voltage. For example, the rectifying and smoothing circuit 30 may include a bridge diode 51 for rectification, and a smoothing capacitor for smoothing the rectified current. Although not shown, the rectifying and smoothing circuit 30 may exclude at least one element from or include a new element to the elements shown in FIG. 3.

The switching circuit 31 may include a transformer that applies an input voltage VIN rectified by the rectifying and smoothing circuit 30 to a primary coil 55 and induces the operation voltage Vout in a secondary coil 57. As shown in FIG. 3, the switching circuit 31 may further include a MOSFET 54 connected in series to the primary coil 55 and switching the current on and off, a diode 58 provided at the secondary coil 57 and rectifying the operation voltage Vout, and a capacitor 59 for maintaining the level of the operation voltage Vout. There may be one or at least two operation voltages Vout. If there are a plurality of operation voltages Vout, the switching circuit 31 may further include the same or similar elements as the secondary coil 57, the diode 58 and the capacitor 59 in accordance with each of the operation voltages Vout. In this case, the plurality of operation voltages Vout may have different voltages relative to one another in accordance with objects to which the operation voltages are supplied.

The switching circuit 31 is provided so that the operation voltage Vout having a level needed for the system can be output even in the power saving mode.

The feedback input 33 feeds the operation voltage Vout for the switching operation back to the power IC 40. The feedback input 33 may include the feedback registers 60, 61, 63 and 64 so as to feed back the operation voltage Vout. The feedback input 33 may include a first insulator 66 in order to supply the feedback voltage VFB to the power IC 40, and the first insulator 66 may be achieved by a photo coupler. The feedback input 33 may include a capacitor 62 in order to stably supply the feedback voltage VFB to the power IC 40. The feedback input 33 may discharge the operation voltage Vout so that it is not supplied to the power IC 40 if the operation voltage Vout is excessive. The feedback input 33 may include a Zener diode 65 for discharging the operation voltage Vout. Although not shown, the feedback input 33 may exclude at least one element from or include a new element to the elements shown in FIG. 3.

The mode selection input 34 may receive a signal for selecting a mode for the switching operation. The mode selection input 34 receives a signal for the normal mode or the power saving mode selected in the exterior, and transmits the signal to the power IC 40. The mode selection input 34 may include a second insulator 68 for preventing distortion of the mode signal to be transmitted to the power IC 40, and the second insulator 68 may be achieved by a photo coupler. Although not shown, the mode selection input 34 may exclude at least one element from or include a new element to the elements shown in FIG. 3.

The timing setter 35 sets the timing of the switching operation for supplying the operation voltage Vout to the display apparatus 2 when the display apparatus 2 is in the power saving mode. The timing setter 35 may be controlled by the power IC 40 so that the capacitor 74 can be charged and discharged based on the level of the charging voltage VT of the capacitor 74. The timing setter 35 may set the timing of the switching operation based on the charging and discharging time of the charging voltage VT of the capacitor 74. Below, the timing setter 35 will be described with reference to FIG. 5. The timing setter 35 enters the discharging section 511 when the display apparatus 2 is in the power saving mode 501, and is controlled by the power IC 40 so as to disable the switching operation for supplying the operation voltage Vout. In the timing setter 35, the charging voltage VT of the capacitor 74 is dropped during the discharging section 511 and boosted up during the charging section 512 by the power IC 40, along with the auxiliary voltage Vcc for the switching operation. The lower limit 502 for the charging voltage VT of the capacitor 74 may be set in consideration of the stability of the operation voltage Vout. The operation voltage Vout continues to decrease even after the charging voltage VT reaches the lower limit 502, and decreases until the charging voltage VT is boosted up and reaches the upper limit 503 as the capacitor 74 is charged. The lower limit 502 of the charging voltage VT may be set not to drop the operation voltage Vout below a predetermined level. For example, the lower limit 502 of the charging voltage VT may be set not to drop the operation voltage Vout below a minimum level (hereinafter, referred to as a 'stable level') where the system 32 will not reset or does not malfunction. If the auxiliary voltage Vcc reaches the upper limit 503 and the timing setter 35 enters the switching-on section 513, the charging voltage VT and the auxiliary voltage Vcc are discharged and dropped, and the disabled switching operation is resumed to thereby boost up the operation voltage Vout. The operation voltage Vout may be set to be higher than the stable level even though the auxiliary voltage Vcc reaches the upper limit 503. If the operation voltage Vout reaches the upper limit 504 and the timing setter 35 enters the switching-disable section 514, the charging voltage VT of the timing setter 35 is discharged and dropped. Since the foregoing processes are repeated while the power saving mode continues, it is possible to control the switching operation based on the timing set through the level control of the charging voltage VT and the auxiliary voltage Vcc in the power saving mode.

The power IC 40 may control the switching operation for outputting the operation voltage Vout based on the set timing when the display apparatus 2 is in the power saving mode. The power IC 40 may include the second controller 36, a charger/discharger 42, a switch driver 43, an auxiliary power supply 44, a feedbacker 45 and a mode selector 46. The power IC 40 may receive the power saving mode signal from the mode selection input 34. Below, the power IC 40 will be described with reference to FIG. 5. If the discharging section 511 starts in response to the power saving mode signal, the power IC 40 controls the switching operation and the feedback operation to be disabled. When the charging voltage VT reaches the lower limit 502 and the charging section 512 starts, the power IC 40 controls the charging voltage VT and the auxiliary voltage Vcc to be charged by the internal power source. When the auxiliary voltage Vcc reaches the upper limit 503 and the switching-on section 513 starts, the power IC 40 controls the disabled switching and feedback operations to be enabled. When the operation voltage Vout reaches the upper limit 504, the power IC 40 enters the switching-disable section 514 and controls the enabled switching and feedback operations to be disabled. The power IC 40 stops the switching operation and the feedback operation during the discharging section 511, the charging section 512 and the switching-disable section 514 when the display apparatus 2 is in the power saving mode, and thus reduces the power consumption required for the switching and feedback operations.

Below, the power IC 40 will be described in detail with reference to FIG. 4.

The charger/discharger 42 supplies the power of the internal power source to the capacitor 74 of the timing setter 35 and a capacitor 73 of the auxiliary power supply 44. The charger/discharger 42 may be selectively connected to the internal power source, the capacitor 74 of the timing setter 35 and the capacitor 73 of the auxiliary power supply 44. The charger/discharger 42 may include a switch. The charger/discharger 42 may charge the charging voltage VT of the timing setter 35 and the auxiliary voltage Vcc of the auxiliary power supply 44 with the internal power source under control of the second controller 36.

The switch driver 43 drives a MOSFET 54 to perform the switching operation. The switch driver 43 may for example drive the MOSFET 54 by a pulse width modulation (PWM) method. The switch driver 43 may be enabled or disabled under control of the second controller 36. If the switch driver 43 is disabled, the switching operation may be skipped.

The auxiliary power supply 44 supplies the auxiliary voltage Vcc needed for controlling the switching operation. The auxiliary power supply 44 may include an auxiliary coil 70 that induces a current when the input voltage VIN is applied to the primary coil 55 in the normal mode of the display apparatus 2. The auxiliary power supply 44 may further include a diode 72 provided at the auxiliary coil 70 to rectify the auxiliary voltage Vcc and capacitors 71 and 73 to maintain the level of the auxiliary voltage. The auxiliary power supply 44 is charged by the internal power source when the display apparatus 2 is in the power saving mode, and outputs the auxiliary voltage Vcc, thereby supplying the power needed for controlling the switching operation to the switch driver 43.

The feedbacker 45 supplies the feedback voltage VFB to the second controller 36. The feedbacker 45 may be enabled or disabled under control of the second controller 36. If the switching operation is skipped, the feedbacker 45 may be disabled. If the feedbacker 45 is disabled, the power consumption due to the feedback operation is decreased.

The mode selector 46 may receive a signal for selecting the mode for stopping the switching operation. The mode selection input 34 receives the power saving mode signal and transmits the power saving mode signal to the second controller 36. In response to the power saving mode signal, the second controller 36 disables the switching driver 43 and the feedbacker 45 and thus decreases the power consumption due to the switching and feedback operations.

Figure 4:
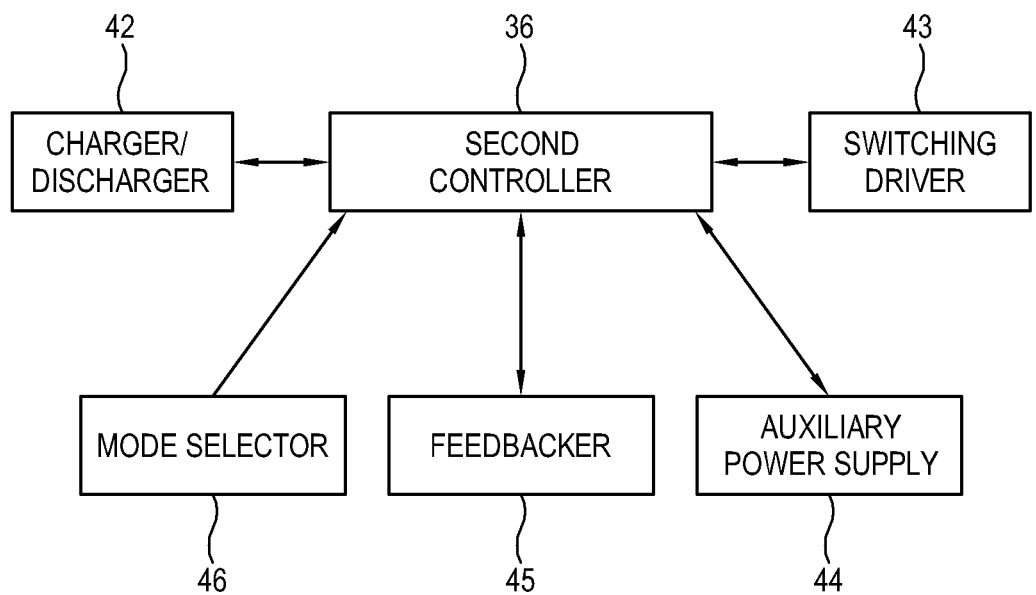
FIG. 4 is a block diagram of a power integrated circuit (IC) in FIG. 3 according to an exemplary embodiment.

According to an exemplary embodiment with reference to FIG. 4 and FIG. 5, the power supply for the display apparatus 2 includes the switching driver 43 that performs the switching operation to output the operation voltage Vout, the first charger/discharger that sets the timing of the switching operation, and the controller 36 that controls the switching driver to disable the switching operation until the voltage previously charged in the first charger/discharger is discharged up to a first voltage 502 when the display apparatus is in the power saving mode.

Further, the power supply may further include a second charger/discharger to supply power needed for the switching operation, and the controller 36 may charge the first charger/discharger and the second charger/discharger so that the voltage of the second charger/discharger can be charged up to the second voltage 503, and control the switching driver 43 to perform the switching operation and output the operation voltage Vout when the voltage of the second charger/discharger is charged up to the second voltage 503.

Also, if the switching operation is performed to boost up the operation voltage Vout so that the operation voltage Vout can be boosted up to a third voltage 504, the controller 36 of the power supply may control the switching operation to be disabled.

In addition, the power supply may further include the auxiliary power supply 44 for charging the first charger/discharger and the second charger/discharger, and the controller 36 may control the auxiliary power supply 44 to supply the auxiliary voltage Vcc to the first charger/discharger and the second charger/discharger from the time when the charging voltage of the first charger/discharger is discharged into the first voltage 502 to the time when the auxiliary voltage Vcc of the second charger/discharger is charged up to the second voltage 503.

Furthermore, the power supply may include the feedbacker 45 for feeding back the operation voltage Vout and the mode selector 46 for receiving a signal to select the mode about whether to disable the switching operation, and the controller may control the feedbacker 45 to disable the feedback operation when the switching operation is disabled, and determine whether to disable the switching operation in response to the signal received in the mode selector 46.

The power IC 40 shown in FIG. 4 is merely an example, and in other exemplary embodiments at least one element may be excluded or a new element may be included with the elements shown in the power IC 40.

Figure 6:
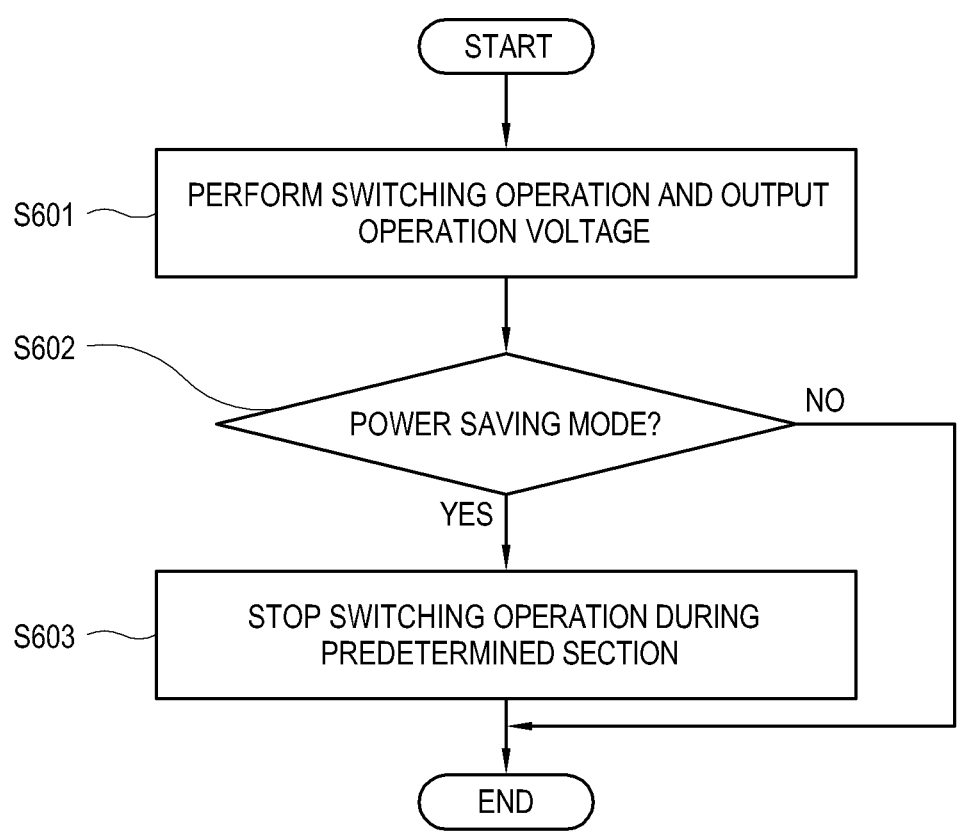
FIG. 6 is a flowchart showing a switching operation according to an exemplary embodiment.

FIG. 6 is a flowchart showing a switching operation of the power supply 24 according to an exemplary embodiment.

The power supply 24 performs the switching operation when the display apparatus 2 is in the normal mode, thereby outputting the operation voltage Vout (S601). If the power supply 24 receives the power saving mode signal of the display apparatus 2 (S602), the power supply 24 stops the switching operation during a predetermined section (S603), thereby reducing the power consumption due to the switching operation. On the other hand, if the normal mode continues, the switching operation is also continued.

Figure 7:
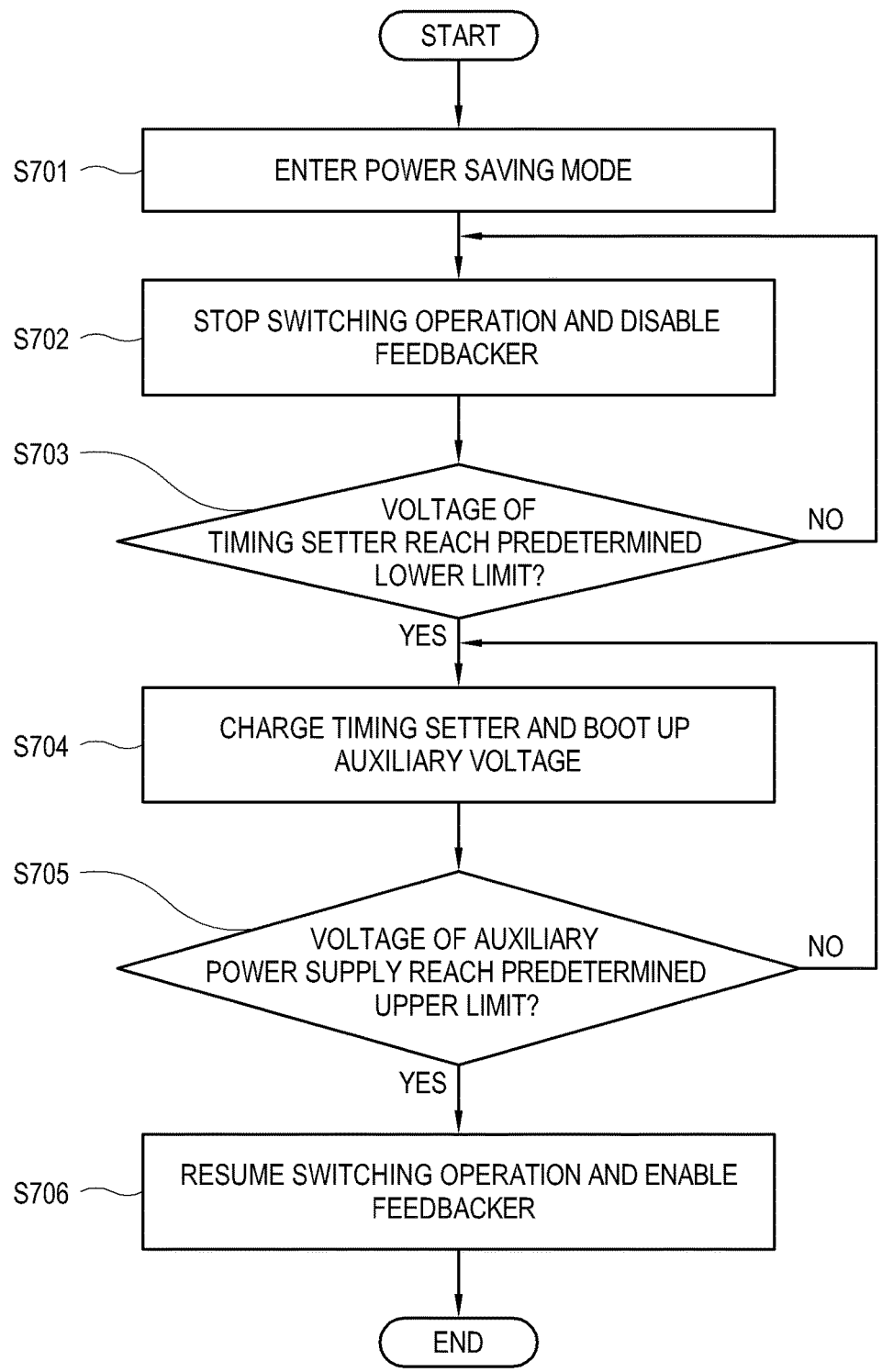
FIG. 7 is a flowchart showing a switching operation and a feedback operation according to an exemplary embodiment.

FIG. 7 is a flowchart showing a switching operation and a feedback operation of the power supply 24 according to an exemplary embodiment. Below, the operations of the power supply 24 will be described in detail with reference to FIG. 7. If the normal mode is changed to the power saving mode 501 (S701), the switching operation is stopped to disable the feedbacker 45 (S702). Until the charging voltage VT of the timing setter 35 reaches a predetermined lower limit 502, the switching operation is continuously stopped and the feedbacker 45 is also continuously disabled. If the charging voltage VT reaches a predetermined lower limit 502 (S703), the charging voltage VT of the timing setter 35 and the auxiliary voltage Vcc for controlling the switching operation are boosted up (S704). If the auxiliary voltage Vcc of the auxiliary power supply 44 reaches a predetermined upper limit 503 (S705), the switching operation is resumed to boost up the level of the operation voltage Vout output to the system, and the feedbacker 45 is enabled to feed back the operation voltage Vout (S706).

Figure 8:
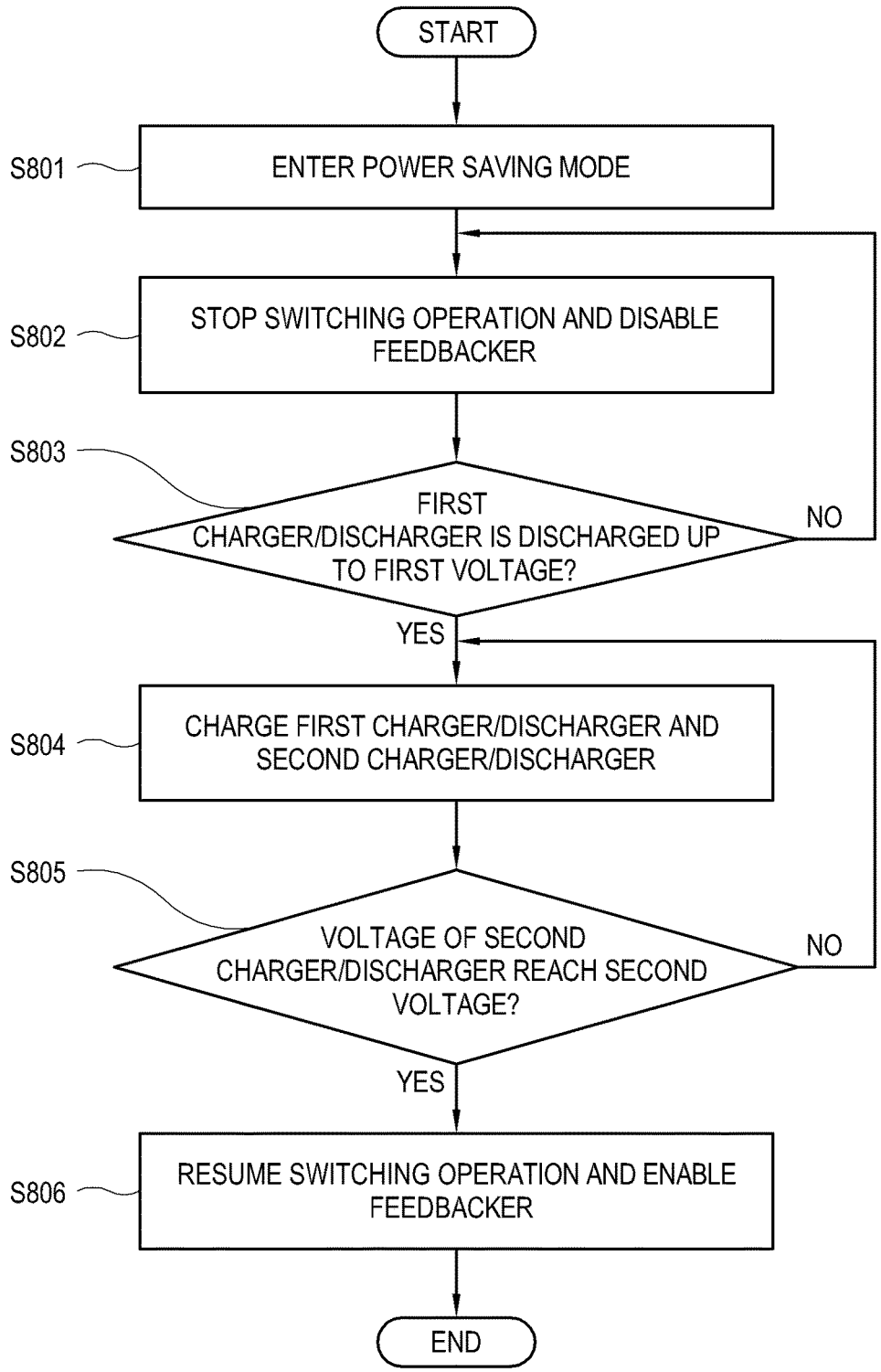
FIG. 8 is a flowchart showing a switching operation and a feedback operation according to another exemplary embodiment.

FIG. 8 is a flowchart showing a switching operation and a feedback operation of the power supply 24 according to another exemplary embodiment.

If the normal mode of operation is changed to the power saving mode 501 (S801), the switching operation is stopped to disable the feedbacker 45 (S802). Until the voltage of the first charger/discharger is discharged up to first voltage 502, the switching operation is continuously stopped and the feedbacker 45 is also continuously disabled. If the voltage of the first charger/discharger is discharged up to first voltage 502 (S803), the first charger/discharger and second charger/discharger for controlling the switching operation are boosted up (S804). If the voltage of the second charger/discharger reaches second voltage 503 (S805), the switching operation is resumed to boost up the level of the operation voltage Vout output to the system, and the feedbacker 45 is enabled to feed back the operation voltage Vout (S806).

Accordingly, it is possible to reduce the power consumption due to the switching operation and the feedback operation.

Although a few exemplary embodiments have been shown and described, it will be appreciated by those skilled in the art that changes may be made in these exemplary embodiments. For instance, in the foregoing embodiment, the power supply 24 is provided as an element included in the display apparatus 2, but the exemplary embodiments are not limited to a display apparatus. For example, in another exemplary embodiment a power supply having the same or similar configuration to the power supply 24 may be provided separately from the display apparatus 2 and supply the operation voltage Vout to the display apparatus 2. In other exemplary embodiments, the power supply having the same or similar configuration to the power supply 24 may be used with electronic apparatuses other than a display apparatus.

As described above, according to an exemplary embodiment, it is possible to decrease power consumption due to the feedback operation of the operation voltage needed for controlling the timing of the switching operation in order to skip the switching operation when an apparatus, such as the display apparatus, is in a power saving mode.

What is claimed is:

1. A power supply for an electronic apparatus, comprising:
    a switching driver configured to perform a switching operation and output an operation voltage;
    a first charger/discharger configured to set a timing of the switching operation; and
    a controller configured:
        in response to the electronic apparatus being in a normal mode, to control the switching driver to perform the switching operation so that the operation voltage reaches to a target voltage, and
        in response to the electronic apparatus being in a power saving mode, to perform a first operation for controlling the switching driver to disable the switching operation until the operation voltage decreases from the target voltage to a predefined voltage lower than the target voltage, and to perform a second operation for controlling the switching driver to perform the switching operation until the operation voltage increases from the predefined voltage to the target voltage,
    wherein the controller performs repeatedly the first operation and the second operation during the power saving mode.

2. The power supply according to claim 1, further comprising: a second charger/discharger configured to supply power for the switching operation,
    wherein the controller is configured to charge the first charger/discharger and the second charger/discharger so that a voltage of the second charger/discharger can be charged to a second voltage, and to control the switching driver to perform the switching operation and output the operation voltage when the voltage of the second charger/discharger is charged to the second voltage.

3. The power supply according to claim 2, wherein the controller is configured to control the switching operation to be disabled when the output operation voltage reaches a third voltage.

4. The power supply according to claim 2, further comprising: an auxiliary power supply configured to charge the first charger/discharger and the second charger/discharger,
    wherein the controller is configured to control the auxiliary power supply to supply an auxiliary voltage to the first charger/discharger and the second charger/discharger from a time when a charging voltage of the first charger/discharger is discharged to the predefined voltage to a time when the auxiliary voltage of the second charger/discharger is charged to the second voltage.

5. The power supply according to claim 3, further comprising: a feedbacker configured to feed back the operation voltage for the switching operation,
    wherein the controller is configured to control the feedbacker to disable the feed back of the operation voltage when the switching operation is disabled.

6. The power supply according to claim 3, further comprising: a mode selector configured to receive a signal for selecting a mode to disable the switching operation, wherein the controller is configured to determine whether to disable the switching operation in accordance with the signal received by the mode selector.

7. A method of controlling a power supply for an electronic apparatus that comprises a switching driver for supplying an operation voltage, the method comprising:
controlling the switching driver to perform a switching operation and output the operation voltage;
in response to the electronic apparatus being in a normal mode, controlling the switching driver to perform the switching operation so that the operation voltage reaches to a target voltage; and
in response to the electronic apparatus being in a power saving mode, performing a first operation for controlling the switching driver to disable the switching operation until the operation voltage decreases from the target voltage to a predefined voltage lower than the target voltage, and performing a second operation for controlling the switching driver to perform the switching operation until the operation voltage increases from the predefined voltage to the target voltage,
wherein the method comprises performing repeatedly the first operation and the second operation during the power saving mode.

8. The method according to claim 7, further comprising: performing the switching operation when a voltage of a second charger/discharger for supplying power for the switching operation is charged to a second voltage.

9. The method according to claim 7, further comprising: disabling the switching operation when the operation voltage reaches a third voltage.

10. The method according to claim 8, further comprising: supplying auxiliary power to the second charger/discharger from a time when a charging voltage of the first charger/discharger is discharged to the predefined voltage to a time when the auxiliary voltage of the second charger/discharger is charged to the second voltage.

11. The method according to claim 9, further comprising:
feeding back the operation voltage for the switching operation; and
disabling the feeding back of the operation voltage when the switching operation is disabled.

12. The method according to claim 7, further comprising:
receiving a signal for selecting a mode to disable the switching operation; and
determining whether to disable the switching operation in accordance with the received signal.

13. A display apparatus comprising:
an image processor configured to process an image signal;
a display configured to display an image based on the image signal;
a first controller configured to control the display of the image; and
a power supply configured to supply an operation voltage to the first controller,
the power supply comprising:
a switching driver configured to perform a switching operation and output an operation voltage;
a first charger/discharger configured to set timing of the switching operation; and
a second controller configured:
in response to the display apparatus being in a normal mode, to control the switching driver to perform the switching operation so that the operation voltage reaches to a target voltage, and
in response to the display apparatus being in a power saving mode, to perform a first operation for controlling the switching driver to disable the switching operation until the operation voltage decreases from the target voltage to a predefined voltage lower than the target voltage, and to perform a second operation for controlling the switching driver to perform the switching operation until the operation voltage increases from the predefined voltage to the target voltage,
wherein the second controller performs repeatedly the first operation and the second operation during the power saving mode.

14. The display apparatus according to claim 13, further comprising: a second charger/discharger configured to supply power for the switching operation,
wherein the second controller is configured to charge the first charger/discharger and the second charger/discharger so that a voltage of the second charger/discharger can be charged to a second voltage, and to control the switching driver to perform the switching operation and output the operation voltage when the voltage of the second charger/discharger is charged to the second voltage and to disable the switching operation when the output operation voltage is boosted to a third voltage.

15. The display apparatus according to claim 14, further comprising: an auxiliary power supply configured to charge the first charger/discharger and the second charger/discharger,
wherein the second controller is configured to control the auxiliary power supply to supply an auxiliary voltage to the first charger/discharger and the second charger/discharger from a time when a charging voltage of the first charger/discharger is discharged to the predefined voltage to a time when the auxiliary voltage of the second charger/discharger is charged to the second voltage.

16. The display apparatus according to claim 13, further comprising: a feedbacker configured to feed back the operation voltage for the switching operation,
wherein the second controller is configured to control the feedbacker to disable the feed back of the operation voltage when the switching operation is disabled.

17. A method of controlling a display apparatus which comprises a switching driver for supplying an operation voltage and processes an image signal to display an image, the method comprising:
controlling the switching driver to perform a switching operation and output the operation voltage;
in response to the display apparatus being in a normal mode, controlling the switching driver to perform the switching operation so that the operation voltage reaches to a target voltage; and
in response to the display apparatus being in a power saving mode, performing a first operation for controlling the switching driver to disable the switching operation until the operation voltage decreases from the target voltage to a predefined voltage lower than the target voltage, and performing a second operation for controlling the switching driver to perform the switching operation until the operation voltage increases from the predefined voltage to the target voltage,
wherein the method comprises performing repeatedly the first operation and the second operation during the power saving mode.

18. The method according to claim 17, further comprising:

performing the switching operation when a voltage of a second charger/discharger for supplying power for the switching operation is charged to a second voltage; and disabling the switching operation when the operation voltage reaches a third voltage.

19. The method according to claim 18, further comprising: supplying auxiliary power to the second charger/discharger from a time when a charging voltage of the first charger/discharger is discharged to the predefined voltage to a time when the auxiliary voltage of the second charger/discharger is charged to the second voltage.

20. The method according to claim 17, further comprising:

feeding back the operation voltage for the switching operation; and disabling the feed back of the operation voltage if the switching operation is disabled.

\* \* \* \* \*